No. 700,466.  
Patented May 20, 1902.

M. B. WYLIE.
MINING MACHINE.
(Application filed Apr. 23, 1900.)

(No Model.)  
4 Sheets—Sheet 1.

Witnesses  
Howard D. Orr  
Geo. H. Chandler

Marshal B. Wylie, Inventor,  
By C. A. Snow & Co.  
Attorneys

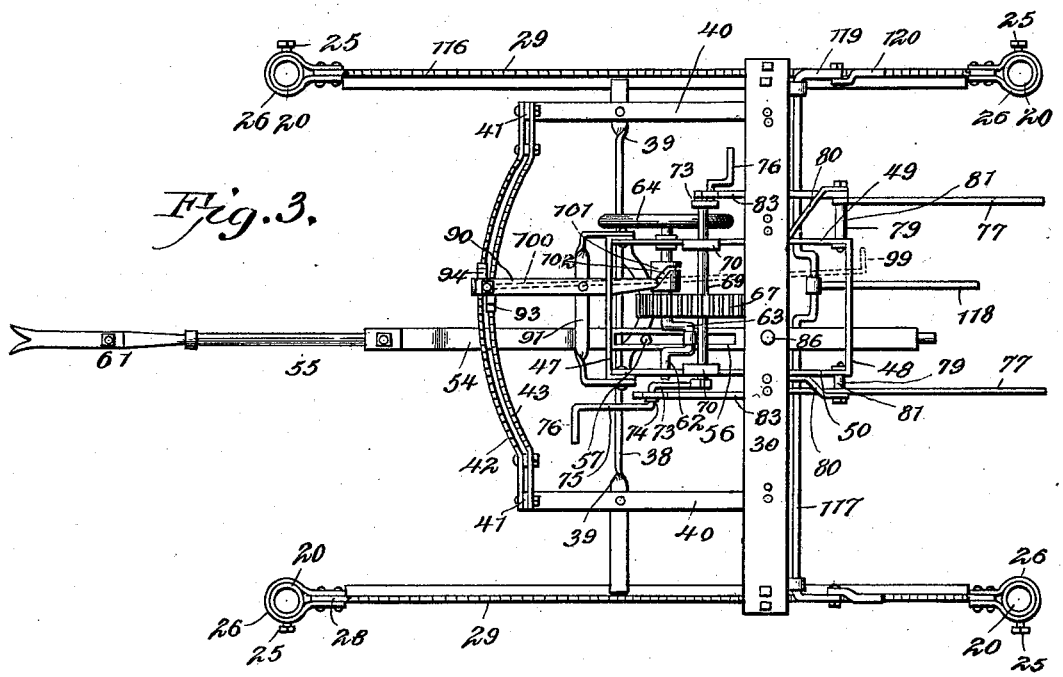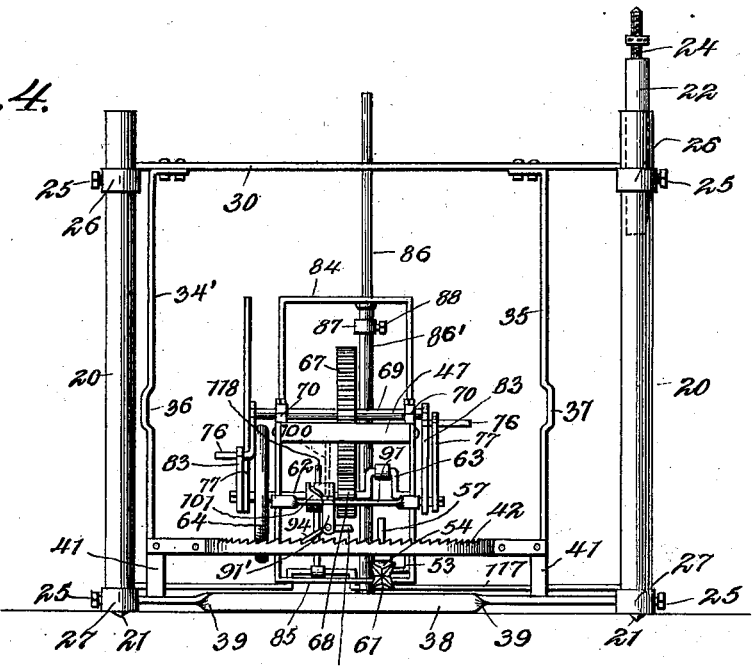

No. 700,466. Patented May 20, 1902.
M. B. WYLIE.
MINING MACHINE.
(Application filed Apr. 23, 1900.)
(No Model.) 4 Sheets—Sheet 3.

Witnesses
Howard D. Orr.

Marshal B. Wylie, Inventor,
By C. A. Snow & Co.
Attorneys

No. 700,466. Patented May 20, 1902.
M. B. WYLIE.
MINING MACHINE.
(Application filed Apr. 23, 1900.)
(No Model.) 4 Sheets—Sheet 4.
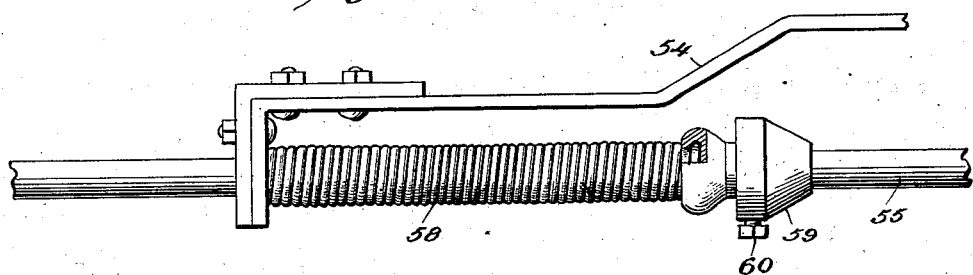
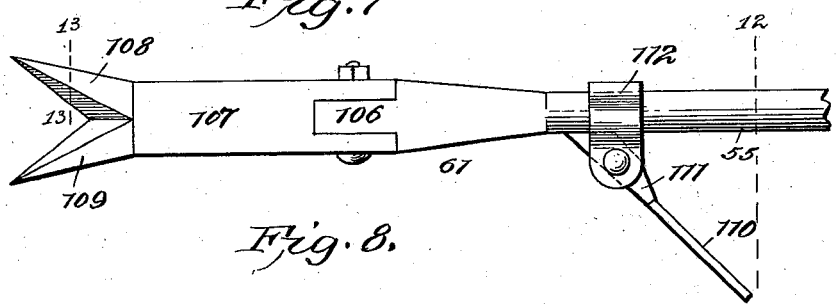
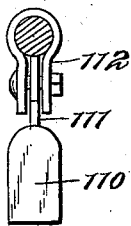
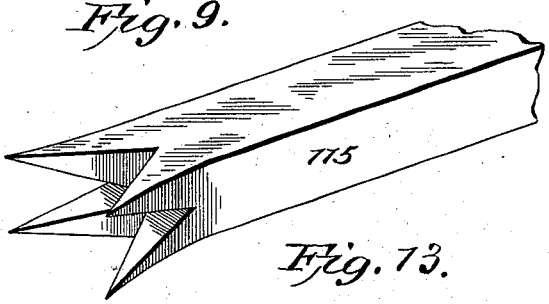
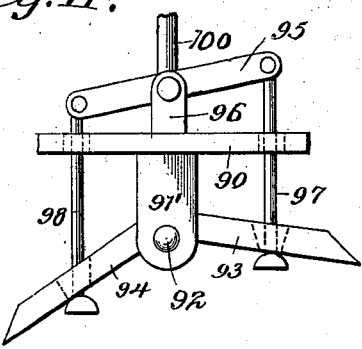
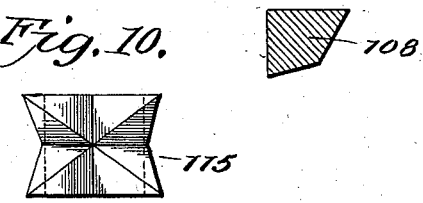
Witnesses
Howard D. Orr.
Marshal B. Wylie, Inventor
By C. A. Snow & Co.
Attorneys

UNITED STATES PATENT OFFICE.

MARSHAL B. WYLIE, OF PARIS, ARKANSAS.

MINING-MACHINE.

SPECIFICATION forming part of Letters Patent No. 700,466, dated May 20, 1902.

Application filed April 23, 1900. Serial No. 14,067. (No model.)

*To all whom it may concern:*

Be it known that I, MARSHAL B. WYLIE, a citizen of the United States, residing at Paris, in the county of Logan and State of Arkansas, have invented a new and useful Mining-Machine, of which the following is a specification.

This invention relates to mining-machines in general, and more particularly to that class in which the cuts are made by means of a reciprocatory drill which is movably mounted and is adapted for adjustment to make the mining cuts, as well as the shear cuts, the object of the invention being to provide a simple and effective mechanism in which lateral swinging motion will be given to the drill-carriage to similarly move the drill and in which vertical swinging movement may also be given to the carriage and to the drill, the change in the pivotal swinging movement being secured in a simple manner.

A further object of the invention is to provide such an arrangement of parts that the drill will be reciprocated at the same time that it is swung pivotally and in which the mechanism will be so disposed that it may be operated by hand from the rear or from the side of the machine or may be operated from the rear and the side simultaneously and in which, furthermore, the carriage may be advanced as the cutting progresses and may be adjusted bodily, both vertically and laterally.

Further objects and advantages of the invention will be evident from the following description and include the formation of special drill-bits for the mining and shear cuts, which will not clog, and the provision of means for clearing out the cuts as they are made.

Figure 1:
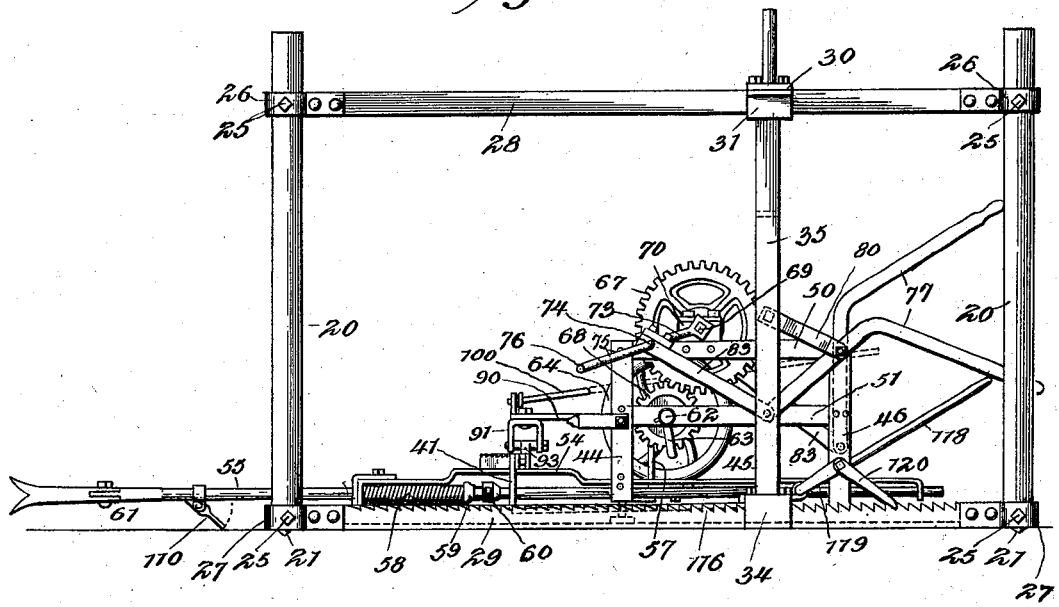
Figure 2:
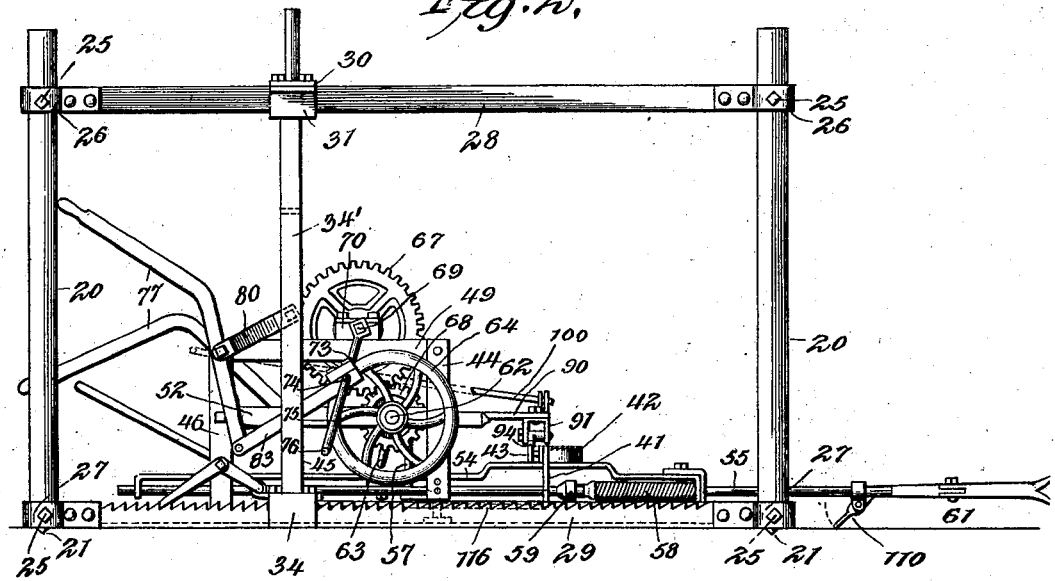
Figure 5:
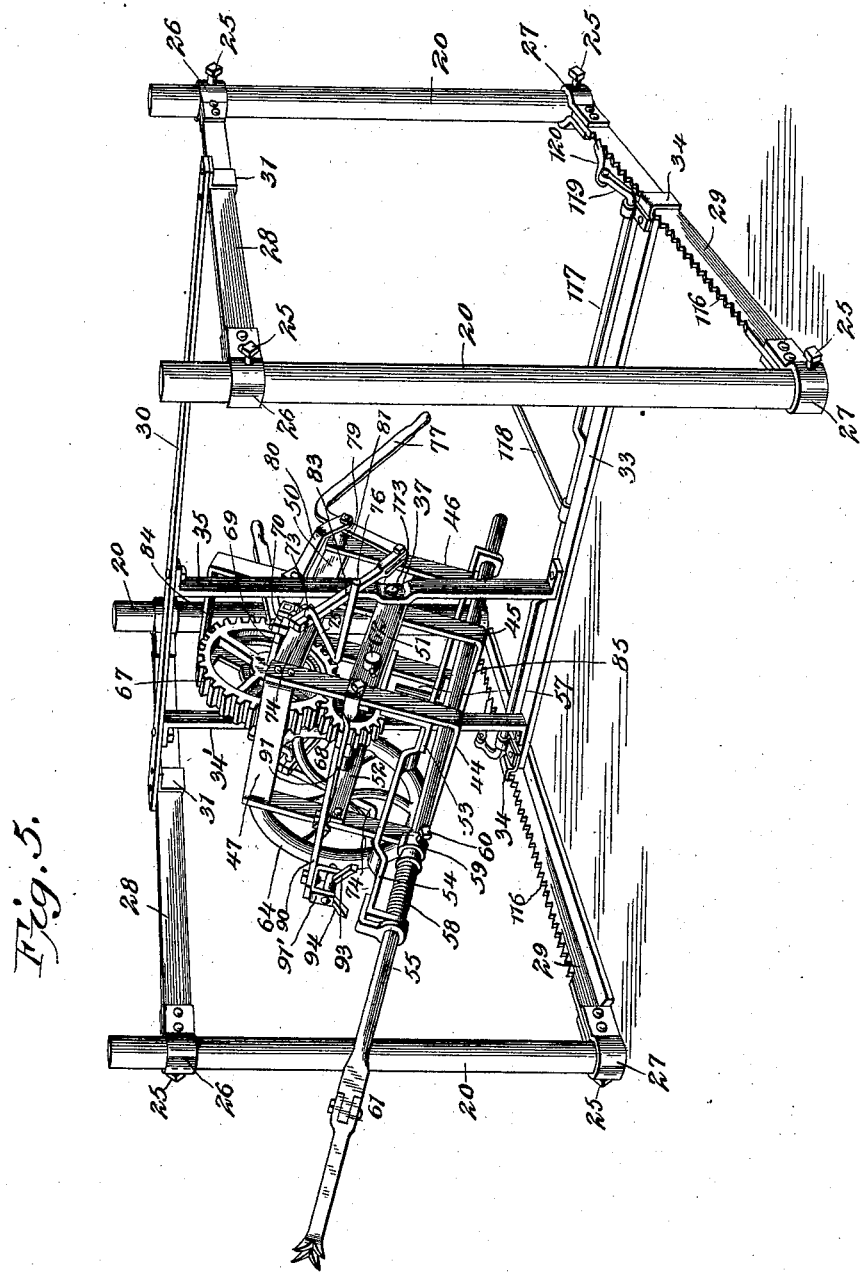

In the drawings forming a portion of this specification, and in which like numerals of reference indicate similar parts in the several views, Figure 1 is a side elevation showing the complete machine with the parts adjusted for making the mining cut, the machine to be operated from the rear or from the side or at both points simultaneously. Fig. 2 is a reverse view of Fig. 1. Fig. 3 is a top plan view of the complete machine in the position shown in Fig. 1. Fig. 4 is a front elevation of the machine. Fig. 5 is a perspective view of the complete machine pivoted for swinging movement in a vertical plane to make the shear cuts. Fig. 6 is a detail elevation showing the spring for striking the blow when the drill-rod is released and illustrating the adjustable collar for adjusting the tension of the spring. Fig. 7 is a detail elevation of the outer end of the drill-rod with one form of bit attached thereto and illustrating the form and arrangement of the clearer, this bit being employed in making the mining cut. Fig. 8 is a side elevation of the drill-bit shown in Fig. 7, taken at right angles to Fig. 7. Fig. 9 is a perspective view of a second form of bit employed in making the shear cuts. Fig. 10 is an end view of the drill shown in Fig. 9. Fig. 11 is a detail elevation showing the mechanism for shifting the pawls for feeding the carriage pivotally in lateral directions. Fig. 12 is a section on line 12 12 of Fig. 7 and showing the clearer for taking out the cuttings during the drilling operation. Fig. 13 is a section on line 13 13, Fig. 7.

Referring now to the drawings, the mining-machine comprises a substantially rectangular frame including corner-uprights 20, which are tubular in form and each of which has a spike 21 at its lower end to permit secure anchoring of the frame during the drilling operation. The tubular corner-posts each contain a telescopic member 22, in the upper end of which is engaged a jack-screw 24, having a pointed upper end, whereby the telescopic members may be raised until the ends of the jacks strike the roof of the drift and then clamped in such positions, after which the jack-screws may be adjusted to engage their upper ends into the roof. The telescopic sections are held in their adjusted positions by means of set-screws 25, which are passed through threaded perforations in the posts, and these set-screws act also to support collars 26 and 27 at the upper and lower ends of the corner-posts, respectively, the collars being split and having their ends extended outwardly and parallel to inclose upper and lower brace-bars 28 and 29, respectively, which extend from the front corner-posts to the rear corner-posts of the frame—that is, fore and aft of the machine. These braces are made of angle-rails preferably to give greatest strength.

Connecting the upper brace bars or rails 28 is a lateral brace 30, which rests at its ends upon the brace-rails and is prevented from displacement therefrom by means of U-shaped yokes 31, which engage around the under sides of rails 28 and have their extremities turned outwardly and secured to the under face of brace 30. The brace 30 is thus slidably connected with braces 28 for movement longitudinally of the latter.

The brace-rails 29 are located slightly above the lower ends of the corner-posts, and a cross-brace 33 is disposed with its ends upon these rails, said brace 33 having yokes 34 secured to its ends, which yokes engage the rails 29 slidably. The braces 30 and 33 are connected by upright braces 34' and 35, the ends of which are turned laterally and bolted to the braces 30 and 33, whereby they may be adjusted longitudinally of braces 30 and 33 when desired. The uprights 34' and 35 act also to pivotally support the working parts of the machine during the vertical or shear cuts, the pivotal bearings of the uprights being located at the laterally-bent portions 36 and 37 of the uprights. The pivotal mounting of the machine upon these uprights will be hereinafter more fully described.

An additional transverse brace 38 is connected at its ends to the brace rails or sills 29 of the supporting-frame of the machine, this brace consisting of a flat metal plate, which is given a quarter-twist midway of its ends, as shown at 39, so that it may lie with its lower edge against the floor of the drift and support the parts with less tendency to bend. The ends of the brace 38 lie upon the upper faces of the inwardly-directed flanges of the rails 29 and with their extremities against the vertical portions thereof, so that said braces are prevented from longitudinal displacement.

The brace 38 is employed only during the making of the horizontal or mining cuts, at which time it is connected adjacent its ends to the lower brace 33 by means of cross braces or plates 40, the forward ends of which beyond the lateral brace 38 are bent upwardly, as shown at 41, for the attachment at opposite sides thereof of two arc-shaped racks 42 and 43, which are disposed concentric, the use of this pair of racks being hereinafter explained.

The machine proper comprises a frame including a number of U-shaped plates, in the present instance three, (shown at 44, 45, and 46,) which are disposed in parallel planes and with their corresponding legs in a common plane, the extremities of the legs being connected by end plates 47 and 48 and side plates 49 and 50, respectively. Additional side plates 51 and 52 connect the legs at the sides of the machine and below the extremities thereof, so that the frame is made exceedingly rigid and of great strength.

Upon the inner face of one leg of plate 44 is fixed an angular bracket 53, and secured to this bracket is guide-plate 54 for the drill-rod 55, said plate being secured adjacent its rear end to the web of plate 46, which web is in a plane above the webs of the plates 44 and 45, and the ends of the plate 54 are bent downwardly and are perforated to form slide-bearing for the reciprocatory drill-shaft or drill-rod 55.

The plate 54 extends longitudinally of and above the drill and has a longitudinal slot 56, in which is slidably disposed the lug 57 upon the upper side of the drill-rod, whereby when the lug is engaged and moved longitudinally of the slot the drill-rod, and therewith the drill, will be correspondingly moved.

The drill-rod is held normally in its position to project the drill by means of a helical spring 58, which encircles the drill rod or shaft. This spring is attached at one end to the downturned forward end of the plate 54, while its opposite end is attached to a collar 59, which is slidably disposed upon the drill shaft or rod and is held at different points of its slidable adjustment by means of a set-screw 60. The forward end of the drill-rod is provided with the drill-bit 61, and thus if the lug 57 be engaged and moved rearwardly and then released the spring will be placed under tension and will then by its contraction throw the drill rod or shaft violently forward and strike a blow. In order to thus retract and release the lug 57, a trip-shaft 62 is rotatably mounted in the side plates 51 and 52 of the machine or carriage, this shaft having a crank portion 63 bent laterally from a point between its ends and having such position and dimensions that as the shaft is rotated the crank, which forms the trip and will be so hereinafter designated, will engage the lug 57, and thus with the proper direction of rotation of the shaft 62 will be moved rearwardly and retract the drill rod and shaft with the bit that is carried thereby. The shaft 62 is provided with a fly-wheel 64 to give proper momentum to the apparatus and may also be provided with a band-wheel for engagement by a belt from a suitable source of power. In the present instance, however, I have shown a hand-operated mechanism for rotating the shaft 62, this mechanism consisting of a gear-wheel 67, meshing with a pinion 68 upon shaft 62 and which gear 67 is carried by a crank-shaft 69, mounted in bearings 70 upon the side plates 49 and 50 of the frame of the carriage. The extremities of the shaft 69 are formed as double cranks or have double cranks secured thereto, as preferred, each of these double cranks comprising an inner portion 73, which extends from the shaft at right angles in the usual manner and has a terminal laterally-extending portion 74, which forms the handle of the crank. From the end of each handle portion 74, however, there extends a second or outer crank portion 75, which has a second terminal laterally-extending handle 76. The handles 76 are adapted to be grasped directly by the operators of the machine to rotate the meshing gearing and reciprocate the drill-rod in the manner above explained, while the handle portions 74 are connected with operating-levers. In the present instance two of these operating-levers 77 are employed and are angular, as shown, the power ends of the levers lying at right angles to the work ends thereof and the levers being fulcrumed adjacent the point of meeting of the two portions of the lever-sections. The levers 77 are fulcrumed at the outer ends of stub-shafts 79, from the outer ends of which extend braces 80, which are connected also with the sides of the carriage to hold the stub-shafts rigid. The levers 77 are held at the outer ends of the stub-shafts by means of washers or sleeves 81, disposed upon said shafts, and at their work ends they are connected with the crank-handles 74 by means of pitmen 83. Thus by operating the levers 77 with a pump-like motion the crank-shaft will be operated, the cranks being set on the quarter to prevent coming to a dead-center. Thus it will be seen that by operating either or both of the levers 77 either with or without direct operation of the cranks the shaft 62 will be rotated and the trip operated to retract and release the drill-rod.

In executing the mining cut the drill-carriage is pivoted for lateral swinging movement, as above mentioned, the pivotal arrangement being as follows: The central plate 45 of the carriage is continued above the side plates 49 and 50 and is connected at its top, so that it is, in effect, a loop which is substantially rectangular in outline and comprises an upper end 84 and a lower end 85. Through these ends 84 and 85 are formed perforations with which is engaged a pivot-rod 86, which also pivotally engages perforations in the upper and lower cross-braces 30 and 33 of the main frame of the apparatus. The plate 54 is thus pivotally mounted in the main frame and may be removed therefrom by withdrawing the rod 86. In order to hold the plate 45, and therewith the carriage, at different elevations, a sleeve 86' is slipped on the rod 86 between the upper and lower ends 84 and 85 of the plate 45, and this sleeve is provided with collars 87, with which are engaged set-screws 88, which are passed through the sleeve and into engagement with the pivot-rod 86. Thus by raising the sleeve the carriage will be raised, and by then screwing up the set-screws the carriage will be held in its raised position, the pivot-rod turning in the perforations in the brace bars or plates 30 and 33.

To effect the horizontal pivotal movement of the drill-carriage, the racks 42 and 43 are provided, and coöperating with these racks alternately to move the carriage pivotally in opposite directions is a rock-lever 90, which is pivotally mounted upon a supporting-plate 91, fixed at its ends to the legs of the plate 44 of the carriage. This lever 90 has a fork 91' at its forward end, the legs of which hang downwardly and through the end portions of which is passed a pivot-bolt 92, upon which is pivoted a double pawl comprising engaging portions 93 and 94, which lie at an obtuse angle to each other and are positioned to diverge downwardly. One member 93 is offset from the other member 94, so that as the double pawl is tilted on its pivot one member and then the other will engage its respective rack, and to thus tilt the pawl a rocker 95 is pivoted to an ear 96 upon the forward end of the lever 90, and the ends thereof are connected with the pawl members 93 and 94 through the medium of connecting rods or bolts 97 and 98. The upper ends of these connecting-rods are pivoted to the rocker, and the lower headed ends are engaged with slots in the pawl members, said slots being of such dimensions as to permit rocking movement of the rods therein. The pivot of the rocker permits operative movement of the latter, and in order to thus move the rocker to engage its pawl members alternately with their respective racks this pivot of the rocker is extended rearwardly in the form of an operating-shaft to the rear side of the carriage, where it is provided with an operating-handle 99, by means of which it is rocked, the shaft being shown at 100. Thus it will be seen that if shaft 100 is operated to engage pawl member 93 with its rack 42 and the rock-lever 90 is then operated the carriage will be pivotally moved to the right, and if the pawl member 94 be then engaged with rack 43 then the carriage will be swung to the left, so that the drill-rod, and therewith the drill, will be correspondingly moved in the arc of a circle and with the pivot-rod as a center. To facilitate this movement, the pivot-rod 86 may be provided with ball-bearings.

In order to rock the lever 90, a drum 101 is fixed on the crank-shaft or trip-shaft 62, and this drum has a cam-groove 102, in which is engaged the rear end of the lever. Thus as the trip-shaft is rotated in the manner above described the rock-lever will be oscillated or rocked, causing the operative pawl member thereof to alternately engage and slide freely over the teeth of its respective rack.

To the outer end of the drill-rod is secured the drill-bit 61, which may be attached in the manner shown, which consists in slotting the end of the bit to receive the web 106 at the end of the rod, the bit and rod being held in their assembled positions by means of bolts passed through perforations therein, as shown. The bit employed for the mining cut is of special form and is shown in Figs. 7 and 8 of the drawings. This bit consists of a stock portion 107, the outer end of which is forked to form members 108 and 109, the outer ends of which are bent outwardly to present or form a flaring construction. The inner sides of the members are beveled, so that the sections of each me two sides of an octagon, the diameters of the octagons constantly decreasing from the base to the point of the tooth, such a section being shown in Fig. 12. This pick or bit is flat on one face and is placed with this flat face vertical, so that the flare of the bit or pick will be toward the upper and lower sides of the horizontal or mining cut. With such a form of bit or pick it is found that there is no clogging of the slack in the cut around the pick or drill to an extent sufficient to prevent operation; but in order to completely remove all slack, and thus increase the efficiency of the machine, there is employed a clearer (shown in Figs. 7 and 12 of the drawings) and which clearer consists of a shovel-blade 110, having a handle or stem portion 111, which is pivoted between the ends of a collar 112, which encircles the drill shaft or rod adjacent the base of the bit or pick. This shovel hangs normally with the blade thereof downwardly and with the beveled upper end of the handle or stem portion against the under side of the drill-rod, but is free to move pivotally and fold against the drill-rod. The shovel extends rearwardly of the drill-rod, so that as the drill or pick is moved inwardly the shovel will yield and hinder the movement thereof; but when the rod is moved outwardly to withdraw the bit or pick the shovel scrapes against the lower side of the cut or depends to move close thereto and by engaging the slack moves it rearwardly from the cut. In this manner the cut is kept cleared.

In Fig. 5 of the drawings the machine is shown in perspective in its position for making the vertical or shear cuts. At such times the supporting-braces 40 are removed and therewith the racks 42 and 43, while the uprights 34 and 35 are reversed to cause their laterally-projecting portions 36 and 37 to project toward each other, the upright 37 being shifted along the cross-braces 30 and 33 until said portions 36 and 37 are brought to lie against the outer faces of the plates 51 and 52 of the drill-carriage. The carriage is raised from the cross-brace 33, so that plates 51 and 52 will thus lie in contact with the portions 36 and 37, and through said portions and plates is passed a pivot-bar 113 in a horizontal plane, whereby the carriage may be moved pivotally in a vertical plane and cause the drill bit or pick to effect the shear cut, the carriage being oscillated by hand.

The pick or bit 115, which is used in making the shear cuts, is somewhat different from that employed for the mining cut in that it has four prongs or teeth instead of only two, but, on the other hand, is similar in that it has substantially two of the former bits or picks disposed face to face, with their beveled sides adjacent. The angles of the inner bevels of the teeth are, however, right angles in planes at right angles to the axis of the pick or bit instead of obtuse angles, as in the former instance. With this bit or pick no points of the cut are omitted and a continuous cut is secured, the slack falling away from the points or teeth, and thus preventing clogging. In each instance—that is, in cutting both the horizontal and the vertical cuts—it is of course necessary to advance the carriage to correspondingly move the drill or pick, and for this purpose the upper edge of the vertical flange of the rail 29 at each side of the main supporting-frame is serrated to form ratchet-teeth 116, which slant in the direction of the front of the machine. Upon the cross-brace 33 is pivoted a rock-shaft 117, having an operating-lever 118 conveniently disposed for operation, and the ends of the rock-shaft are turned laterally to form cranks 119, to the extremities of which are pivoted gravity-pawls 120, disposed for engagement with the racks. Thus as the lever 118 is operated the shaft 117 is rocked and the pawls are reciprocated to engage and press against the teeth, so that the cross-brace 33, which is, in effect, a carrier, is moved along the rails 29 to advance the carriage, the cross-brace 30 at the same time sliding along the upper pieces 28. After each cut is made the lever 118 may be operated to raise the pawls from the ratchets, when the carrier or cross-brace 33 may be drawn rearwardly with the drill-carriage and the machine may be manipulated for another cut.

What is claimed is—

1. A mining-machine comprising a fixed main frame, separate supporting devices adapted for interchangeable connection with the main frame, and a drill-carriage constructed and arranged for connection with the supporting devices interchangeably for pivotal movement in different planes at angles to each other.

2. In a mining-machine, the combination with a main frame including rails, of a carrier slidably engaged with the rails, a drill-carriage mounted upon the carrier for pivotal movement, and provided with drill-actuating mechanism comprising a manually-operable element, means connected with said manually-operable element for moving the carriage pivotally and means for advancing the carrier along the rails and including a pedal disposed in proximity to the manually-operable element of the drill-actuating mechanism, whereby one man may operate the drill, swing the carriage and advance the carrier.

3. A mining-machine comprising a drill-carriage having a drill provided with operating means, said carriage being adapted for interchangeable mounting to oscillate in different planes, a reciprocatory pawl operably connected with the drilling mechanism, and a rack mounted in operative relation to the pawl for engagement thereby to move the carriage pivotally, said rack being removable to permit pivotal movement of the carriage in a different plane.

4. A mining-machine comprising a drill-carriage having a drill provided with operating means, said carriage being adapted for interchangeable pivotal mounting to oscillate in different planes, opposing racks, opposing pawls adapted for alternate engagement with their respective racks and operably connected with the drilling mechanism for movement over the racks, and means for throwing the pawls alternately into operative relation to their respective racks.

5. A mining-machine comprising a carriage adapted for pivotal movement, a drill mounted upon the carriage for movement therewith and having operating mechanism, opposing racks, opposing pawls operably connected with the drill-operating mechanism for engagement with the racks to pivotally move the carriage, and means for moving the pawls alternately into engagement with their respective racks.

6. A mining-machine comprising a carriage adapted for pivotal movement, a drill mounted upon the carriage for movement therewith and having operating means comprising a shaft, a lever pivoted upon the carriage and having cam connection with the shaft for oscillation thereby, opposing pawls mounted upon the lever, opposing racks for engagement by the pawls alternately to pivotally move the carriage in opposite directions, and means for moving the pawls alternately into operative relation to their respective racks.

7. A mining-machine comprising a main supporting-frame including uprights and connecting-rails, a carrier slidably engaged with the rails to permit the carrier to be advanced and retracted, separate supporting devices adapted for interchangeable connection with the carrier, and a drill-carriage constructed and arranged for connection with the supports interchangeably for pivotal movement in different planes lying at angles to each other.

8. A mining-machine comprising a main supporting-frame including uprights and connecting-rails, a carrier slidably engaged with the rails to permit the carrier to be advanced and retracted, separate supporting devices adapted for interchangeable connection with the carrier and at both ends thereof, and a drill-carriage constructed and arranged for connection with the supports interchangeably for pivotal movement in different planes at angles to each other.

9. In a drilling mechanism, the combination with a pivotally-mounted drill-carriage and a reciprocatory drill mounted therein, of a rack adjacent to the carriage, a cam-shaft mounted in the carriage and provided with a cam, a lever engaged with the cam and having a pawl in operative relation to the rack to rotate the carriage when the lever is actuated, said shaft having means for engagement with the drill to retract it, means for moving the drill forwardly when released by its retracting means, and means for actuating the shaft.

10. In a drilling mechanism, the combination with a pivotally-mounted carriage and a reciprocatory drill mounted therein, of racks disposed adjacent to the carriage and having their teeth arranged in opposition, a shaft mounted in the carriage and provided with a cam, a lever pivoted on the carriage and engaged with the cam for oscillation thereby, pawls carried by the lever for alternate engagement with their respective racks, means for actuating the shaft and means for throwing the pawls alternately into operative relation to their respective racks.

11. In a drilling mechanism, the combination with a pivotally-mounted drill-carriage and a reciprocatory drill mounted therein, of opposing racks disposed adjacent to the carriage, a shaft mounted in the carriage and provided with a cam, a lever pivoted on the carriage and engaged with the cam for oscillation thereby, a rocker mounted on the lever, pawls pivoted to the lever and having connection with the rocker for movement thereby to alternately engage their respective racks, means for actuating the rocker, a finger on the drill, a crank on the cam-shaft adapted to engage the finger to move the drill in one direction, means for returning the drill when released by the crank, operating-cranks for the cam-shaft, and hand-levers connected with the operating-cranks for rotating the shaft.

12. A mining-machine comprising a reciprocatory drill-rod provided with a lug, a trip-shaft having a trip for engagement with the lug to retract the drill-rod, means for returning the rod, a crank-shaft provided with double cranks, intermeshing gears upon the crank-shaft and trip-shaft, a handle for one element of each crank, and a rocking lever connected with the second element of each crank.

13. A mining-machine comprising a pivoted carriage, a reciprocatory drill mounted in the carriage and provided with a lug, a trip-shaft mounted in the carriage and having a trip for engagement with the lug to retract the drill, means for returning the drill when released by the trip, means for operating the trip-shaft, and means operably connected with the trip-shaft for moving the carriage pivotally.

14. A mining-machine comprising a pivoted carriage, a reciprocatory drill mounted in the carriage, a trip-shaft having a trip for engagement with the drill to retract it, means for returning the drill when released by the trip, a rack, a pivoted lever operably connected with the trip-shaft for pivotal movement thereby, and a pawl carried by the lever in operative relation to the rack to move the carriage pivotally.

15. A mining-machine comprising a main frame including upper and lower members and uprights removably connected thereto, said uprights having pivot-bearings, a removable pivot-rod engaged with the upper and lower members, and a drill-carriage mounted on the rod removably and adapted for pivotal connection with the uprights.

16. A mining-machine comprising a main frame including upper and lower members and uprights removably connected thereto, a removable pivot-rod engaged with the upper and lower members, a drill-carriage adjustably mounted on the pivot-rod and removable therefrom, said uprights being adapted for attachment to lie adjacent to the sides of the carriage and adapted for pivotal connection with the carriage when the pivot-rod is removed.

17. A drill-bit for mining-machines, comprising a rectangular stock having two pairs of diverging teeth at one end thereof, the points of said teeth lying without the planes of the side faces of the stock, each of the teeth being pyramidal in form, having rectangular bases and being disposed with the mutually-adjacent edges of their bases on two lines, lying in the same plane and intersecting each other at right angles, said teeth being clear of one another from base to point, substantially as described.

18. A machine of the class described comprising a main frame, a carrier mounted for longitudinal movement in said main frame, a drill-carriage and removable pivotal supports, disposed at right angles to each other, to mount said carriage on said carrier, whereby said carriage may be pivotally mounted to be swung either horizontally or vertically, substantially as described.

19. In a machine of the class described, the combination of a relatively fixed support, a carrier movable longitudinally thereon, and means including a pedal-lever to advance said carrier; a drill-carriage mounted for pivotal movement on said carrier, and a drill-operating mechanism in said carrier and having hand-levers, whereby the carrier may be advanced, and the drill operated by a single operator manually, substantially as described.

20. In a machine of the class described, the combination of a relatively fixed support, a carrier movable longitudinally thereon, and means, including a pedal-lever, to advance said carrier, a drill-carriage, mounted for pivotal movement on said carrier, a drill-operating mechanism in said carriage, and having hand-levers, and means operated by said drill-operating mechanism, to automatically swing said drill-carriage pivotally, whereby the carrier may be advanced, the drill-carriage pivotally swung, and the drill mechanism simultaneously operated manually by a single operator, substantially as described.

21. In a machine of the class described, the combination of a main frame, a carrier mounted for longitudinal movement in said main frame, a drill-carriage and removable pivotal supports, disposed at an angle to each other, to mount said carriage on said carrier, whereby said carriage may be pivotally mounted to be swung in correspondingly-angled planes, and a reciprocating drill and operating mechanism therefor, with which said carriage is provided, substantially as described.

22. In a machine of the class described, the combination of a relatively fixed support, a carrier movable longitudinally thereon, means to advance said carrier, a drill-carriage mounted for pivotal movement on said carrier, and a drill-operating mechanism in said carrier and levers with which said carrier-advancing means and drill-operating mechanism are provided, whereby they may be operated manually, by a single operator, substantially as described.

In testimony that I claim the foregoing as my own I have hereto affixed my signature in the presence of two witnesses.

MARSHAL B. WYLIE.

Witnesses:
L. S. BIETHAN,
GEO. V. CHANDLER.